United States Patent
Anderson (10) Patent No.: US 9,815,407 B1
(45) Date of Patent: Nov. 14, 2017

(54) UNATTENDED CHILD SAFETY SEAT ALERT SYSTEM

(71) Applicant: John Anderson, Azle, TX (US)

(72) Inventor: John Anderson, Azle, TX (US)

( * ) Notice: Subject to any disclaimer, the term of this patent is extended or adjusted under 35 U.S.C. 154(b) by 0 days.

(21) Appl. No.: 15/163,037

(22) Filed: May 24, 2016

(51) Int. Cl.
*B60Q 1/00* (2006.01)
*B60Q 9/00* (2006.01)
*G08B 21/02* (2006.01)

(52) U.S. Cl.
CPC ........... *B60Q 9/00* (2013.01); *G08B 21/0205* (2013.01); *G08B 21/0283* (2013.01)

(58) Field of Classification Search
CPC ............... B60W 40/09; B60W 50/08; B60W 2040/0809; B60W 2540/28; B60W 40/08; G01C 21/34; G01C 21/00; G01C 21/26; G01C 21/36; G01C 21/3647; G01C 21/3484; G05D 1/0212; G05D 1/0027; G05D 23/1917
USPC ...... 340/457, 438, 425.5, 457.1, 573.1, 666, 340/665, 667, 573.4, 686.1, 687, 539.1, 340/539.11, 539.22, 686.6, 539.21
See application file for complete search history.

(56) References Cited

U.S. PATENT DOCUMENTS

| | | | |
|---|---|---|---|
| 6,480,103 B1 * | 11/2002 | McCarthy | E05B 83/26 340/425.5 |
| 7,009,522 B2 | 3/2006 | Flanagan | |
| 7,170,401 B1 | 1/2007 | Cole | |
| 7,218,218 B1 | 5/2007 | Rogers | |
| 7,457,695 B1 | 11/2008 | Fields | |
| 7,663,493 B2 | 2/2010 | Monzo | |
| 7,733,228 B2 | 6/2010 | Lee | |
| 8,063,788 B1 | 11/2011 | Morningstar | |
| D650,715 S | 12/2011 | Hill | |
| 9,403,437 B1 * | 8/2016 | McDonald | B60K 37/02 |
| 2002/0161501 A1 * | 10/2002 | Dulin | B06B 1/0215 701/45 |
| 2004/0095252 A1 * | 5/2004 | Kraljic | G08B 21/22 340/687 |
| 2007/0075574 A1 * | 4/2007 | James | B60N 2/002 297/217.3 |
| 2007/0268119 A1 * | 11/2007 | Cram | B60Q 9/00 340/457 |

(Continued)

FOREIGN PATENT DOCUMENTS

WO 2012109472 A2 8/2012

*Primary Examiner* — Daniel Previl
(74) *Attorney, Agent, or Firm* — Kyle A. Fletcher, Esq.

(57) ABSTRACT

The unattended child safety seat alert system is a safety system that is designed to alert travelers when a passenger is left unattended in a safety seat that is adapted for use with an automobile. The unattended child safety seat alert system is a safety system that incorporates a passenger sensor into the safety seat such that the passenger sensor indicates when a passenger is in the safety seat. A control system monitors the passenger sensor and further monitors whether the automobile is in operation. Should the automobile not be operating while a passenger is in safety seat, the unattended child safety seat alert system further monitors the situation and should subsequent conditions be met the unattended child safety seat alert system will issue a plurality of alarms. The unattended child safety seat alert system comprises a passenger sensor, a controller, and a key fob.

19 Claims, 6 Drawing Sheets

(56) References Cited

U.S. PATENT DOCUMENTS

| | | | |
|---|---|---|---|
| 2009/0237229 A1* | 9/2009 | Kautz | B60N 2/2812 340/457 |
| 2016/0200168 A1* | 7/2016 | Boyer | H04R 19/04 701/45 |

* cited by examiner

UNATTENDED CHILD SAFETY SEAT ALERT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of measurements of force, stress, torque or work and apparatus for measuring forces for a special purpose, more specifically, a passenger detection system adapted for vehicles.

SUMMARY OF INVENTION

The unattended child safety seat alert system is a safety system that is designed to alert travelers when a passenger is left unattended in a safety seat that is adapted for use with an automobile. The unattended child safety seat alert system is a safety system that incorporates a passenger sensor into the safety seat such that the passenger sensor indicates when a passenger is in the safety seat. The passenger sensor is monitored by a control system that further monitors whether the engine of the automobile is running as an indication that the automobile is in operation. Should the automobile not be operating while a passenger is in safety seat, the unattended child safety seat alert system monitors the situation and should subsequent conditions be met the unattended child safety seat alert system will: 1) initiate the car alarm; 2) initiate an alarm device that is carried as a key fob; and, 3) will send an alarm message via SMS to a personal data device.

These together with additional objects, features and advantages of the unattended child safety seat alert system will be readily apparent to those of ordinary skill in the art upon reading the following detailed description of the presently preferred, but nonetheless illustrative, embodiments when taken in conjunction with the accompanying drawings.

In this respect, before explaining the current embodiments of the unattended child safety seat alert system in detail, it is to be understood that the unattended child safety seat alert system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the unattended child safety seat alert system.

It is therefore important that the claims be regarded as including such equivalent construction insofar as they do not depart from the spirit and scope of the unattended child safety seat alert system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The unattended child safety seat alert system 100 (hereinafter invention) comprises a passenger sensor 101, a controller 102, and a key fob 103. The invention 100 is a safety system that is designed to alert travelers when a passenger is left unattended in a safety seat 108 that is adapted for use with an automobile. The invention 100 is a safety system that incorporates a passenger sensor 101 into the safety seat 108 such that the passenger sensor 101 indicates when a passenger is in the safety seat 108. The passenger sensor 101 is monitored by the controller 102, which further monitors whether the engine of the automobile is running as an indication that the automobile is in operation. Should the automobile not be operating while a passenger is detected in safety seat 108, the invention 100 monitors the situation and should subsequent conditions be met the invention 100 will: 1) initiate the car alarm 106; 2) initiate an alarm device that is carried as a key fob 103; and, 3) will send an alarm message (second message 152) via SMS to a personal data device 105. The second message 152 is discussed in more detail elsewhere in this disclosure.

The passenger sensor 101 is a sensor that is incorporated into the safety seat 108. When a passenger is seated in the safety seat 108, the passenger sensor 101 senses the weight of the passenger and generates an electric signal called the passenger sensed signal 110 that the controller 102 uses to determine when the safety seat 108 is occupied. The passenger sensor 101 comprises a plurality of pressure sensors 119 and a logic circuit 120. Each of the plurality of pressure sensors 119 is selected from the consisting of a commercially available piezoelectric force sensor or a load cell. The plurality of pressure sensors 119 is further organized into a plurality of seat sensors 128 and a plurality of back rest sensors 129. Each of the plurality of seat sensors 128 is mounted in the seat 181 portion of the safety seat 108. Each of the plurality of back rest sensors 129 are mounted in the back rest 182 portion of the safety seat 108.

The logic circuit 120 is an electrical circuit that monitors each of the plurality of pressure sensors 119 and physically generates the passenger-sensed signal 110. The logic circuit 120 is designed in such a manner that the failure of a single sensor selected from the plurality of pressure sensors 119 will not prevent the proper operation of the invention 100. More specifically, the failure of a first single sensor selected from the plurality of seat sensors 128 and the simultaneous failure of a second single sensor selected from the plurality of back rest sensors 129 will not prevent the invention 100 from successfully sensing the passenger and generating the passenger sensed signal 110.

In a first potential embodiment of the disclosure, the plurality of pressure sensors 119 further comprises a first pressure sensor 111, a second pressure sensor 112, a third pressure sensor 113, a fourth pressure sensor 114, a fifth pressure sensor 115, a sixth pressure sensor 116, a seventh pressure sensor 117, and an eighth pressure sensor 118. The plurality of seat sensors 128 comprises the first pressure sensor 111, the second pressure sensor 112, the third pressure sensor 113, and the fourth pressure sensor 114. The plurality of back rest sensors 129 comprises the fifth pressure sensor 115, the sixth pressure sensor 116, the seventh pressure sensor 117, and the eighth pressure sensor 118.

Figure 5:
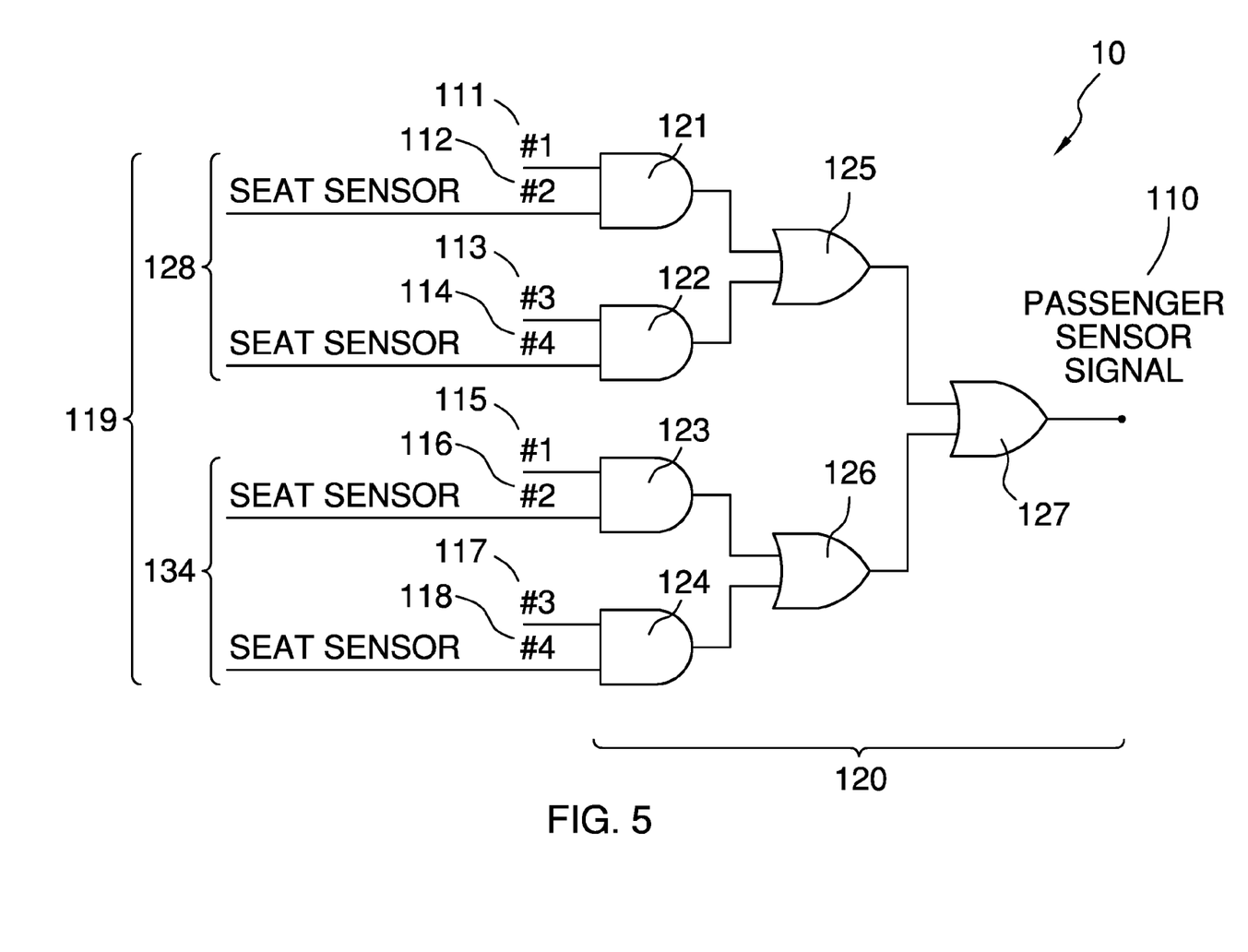
FIG. 5 is a schematic view of an embodiment of the disclosure.

As shown most clearly in FIG. 5, the logic circuit 120 comprises a first And circuit 121, a second And circuit 122, a third And circuit 123, a fourth And circuit 124, a first Or circuit 125, a second Or circuit 126, and a third Or circuit 127. The passenger sensed signal 110 is generated via the passenger sensor 101 as described in this paragraph. The first pressure sensor 111 is connected to the first and circuit 121 such that a first signal is generated via the first pressure sensor 111 when a passenger is detected in the safety seat 108. The second pressure sensor 112 is connected to the first and circuit 121 such that a second signal is generated via the second pressure sensor 112 when a passenger is detected in the safety seat 108. The third pressure sensor 113 is connected to the second and circuit 122 such that a third signal is generated via the third pressure sensor 113 when a passenger is detected in the safety seat 108. The fourth pressure sensor 114 is connected to the second and circuit 122 such that a fourth signal is generated via the fourth pressure sensor 114 when a passenger is detected in the safety seat 108. The fifth pressure sensor 115 is connected to the third and circuit 123 such that a fifth signal is generated via the fifth pressure sensor 115 when a passenger is detected in the safety seat 108. The sixth pressure sensor 116 is connected to the third and circuit 123 such that a sixth signal is generated via the sixth pressure sensor 116 when a passenger is detected in the safety seat 108. The seventh pressure sensor 117 is connected to the fourth and circuit 124 such that a seventh signal is generated via the seventh pressure sensor 117 when a passenger is detected in the safety seat 108. The eighth pressure sensor 118 is connected to the fourth and circuit 124 such that an eighth signal is generated via the eighth pressure sensor 118 when a passenger is detected in the safety seat 108.

When the first signal and the second signal both indicate detection of a passenger in the safety seat 108, the first And circuit 121 generates a positive signal. Otherwise the first And circuit 121 indicates a negative signal. When the third signal and the fourth signal both indicate detection of a passenger in the safety seat 108, the second And circuit 122 generates a positive signal. Otherwise the second And circuit 122 indicates a negative signal. When the fifth signal and the sixth signal both indicate detection of a passenger in the safety seat 108, the third And circuit 123 generates a positive signal. Otherwise the third And circuit 123 indicates a negative signal. When the seventh signal and the eighth signal both indicate detection of a passenger in the safety seat 108, the fourth And circuit 124 generates a positive signal. Otherwise the fourth And circuit 124 indicates a negative signal. The first And circuit 121 and the second And circuit 122 are attached to the first Or circuit 125 such that when either or both the first and circuit 121 and the second And circuit 122 have a positive signal the first Or circuit 125 generates a positive signal. The third And circuit 123 and the fourth And circuit 124 are attached to the second Or circuit 126 such that when either or both the third And circuit 123 and the fourth And circuit 124 have a positive signal the second Or circuit 126 generates a positive signal. The first Or circuit 125 and the second Or circuit 126 are attached to the third Or circuit 127 such that when either or both the first Or circuit 125 and the second Or circuit 126 have a positive signal the third Or circuit 127 generates a positive signal. The output of the third Or circuit 127 is the passenger sensed signal 110. A positive signal from the third Or circuit 127 indicates that a passenger is in the safety seat 108.

Figure 1:
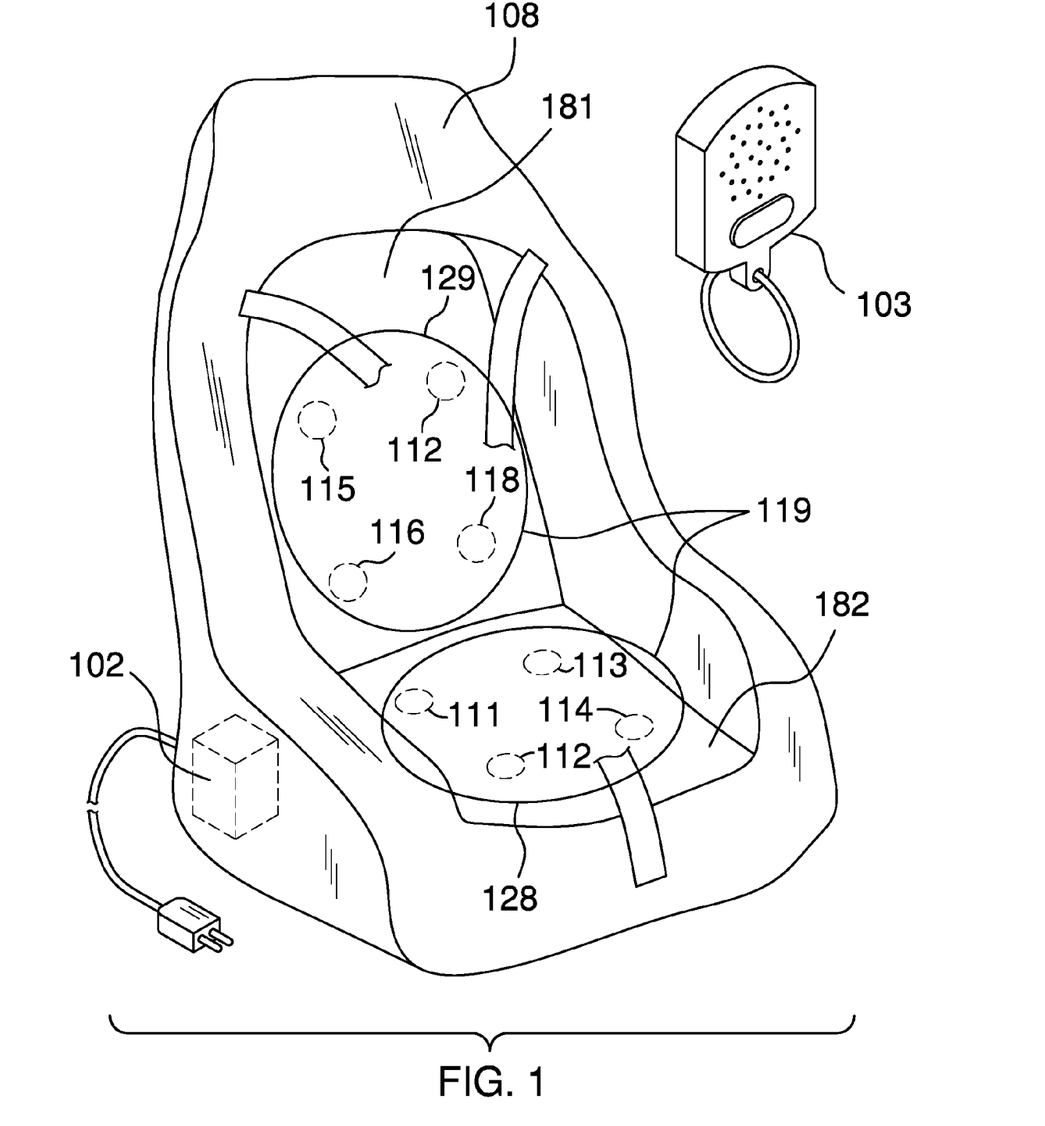
FIG. 1 is a perspective view of an embodiment of the disclosure.
Figure 2:
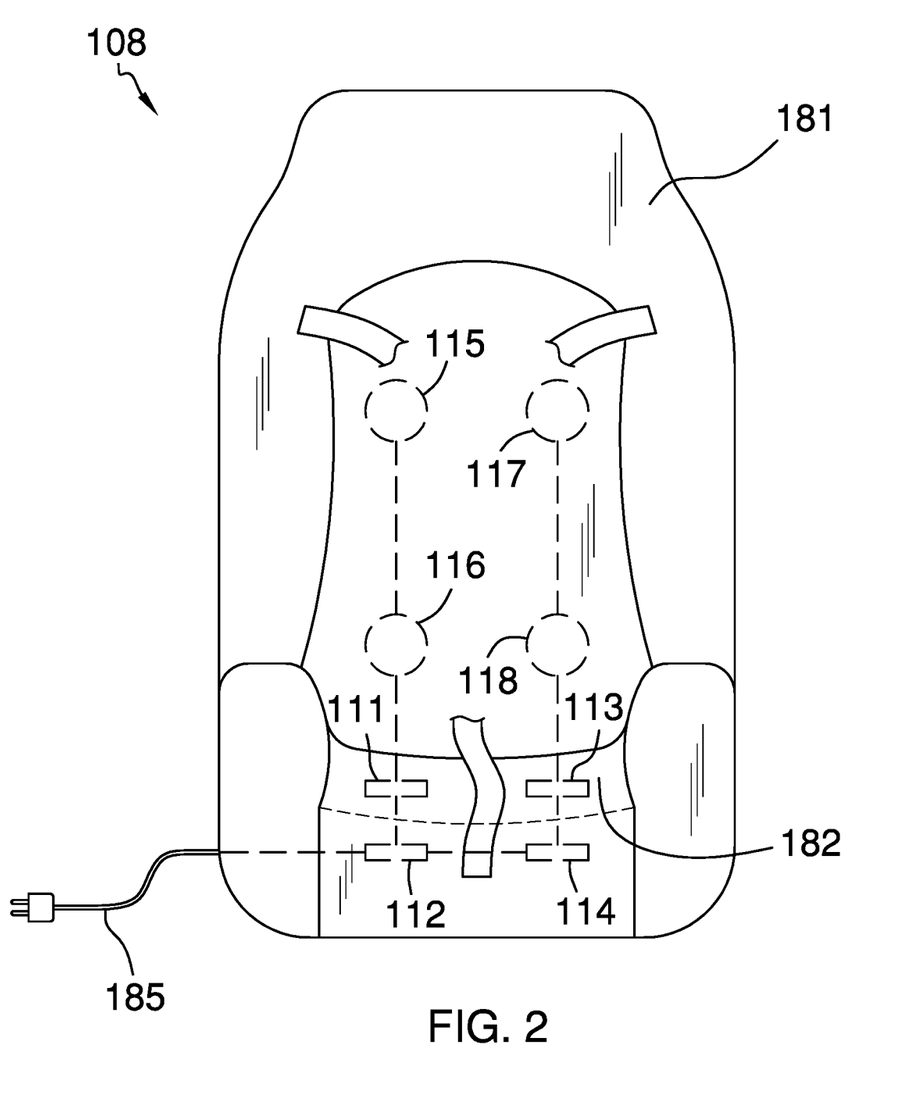
FIG. 2 is a front view of an embodiment of the disclosure.
Figure 3:
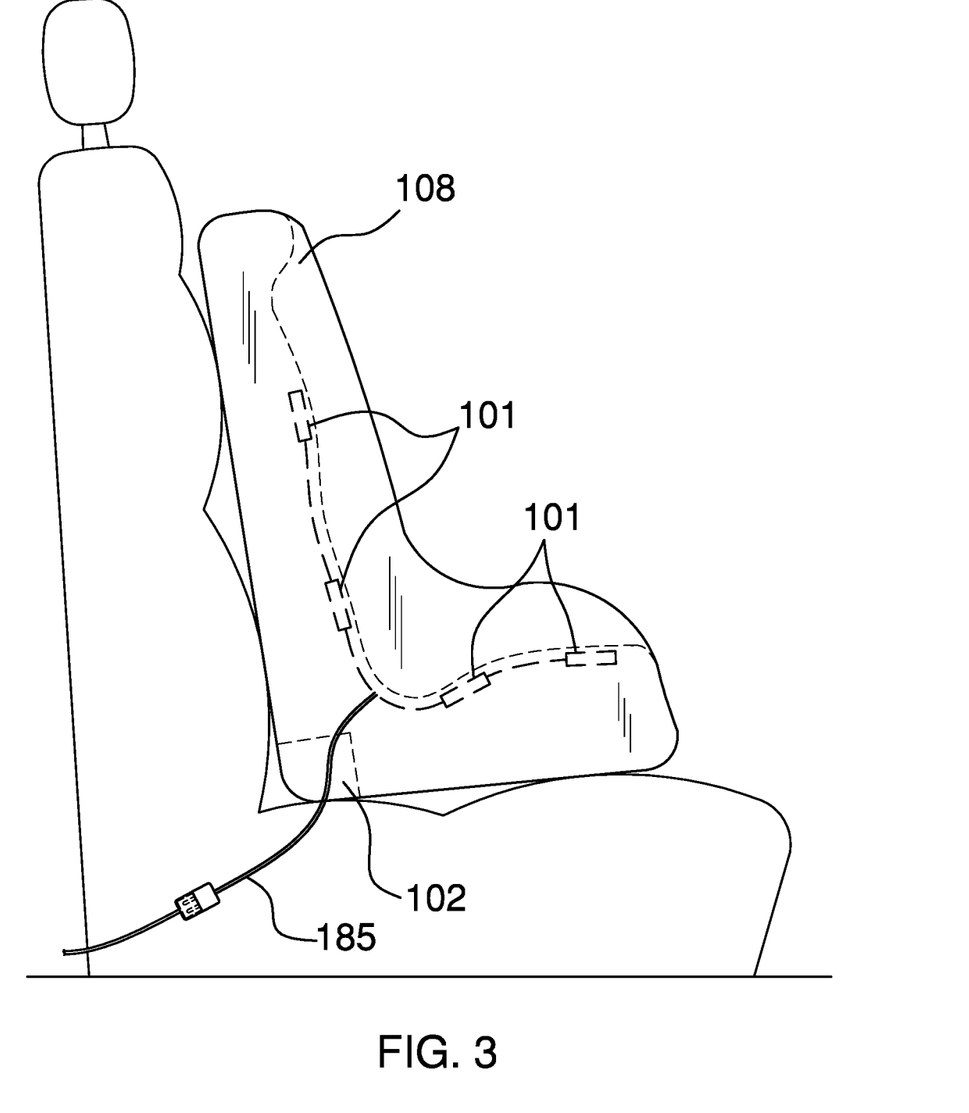
FIG. 3 is a side view of an embodiment of the disclosure.
Figure 4:
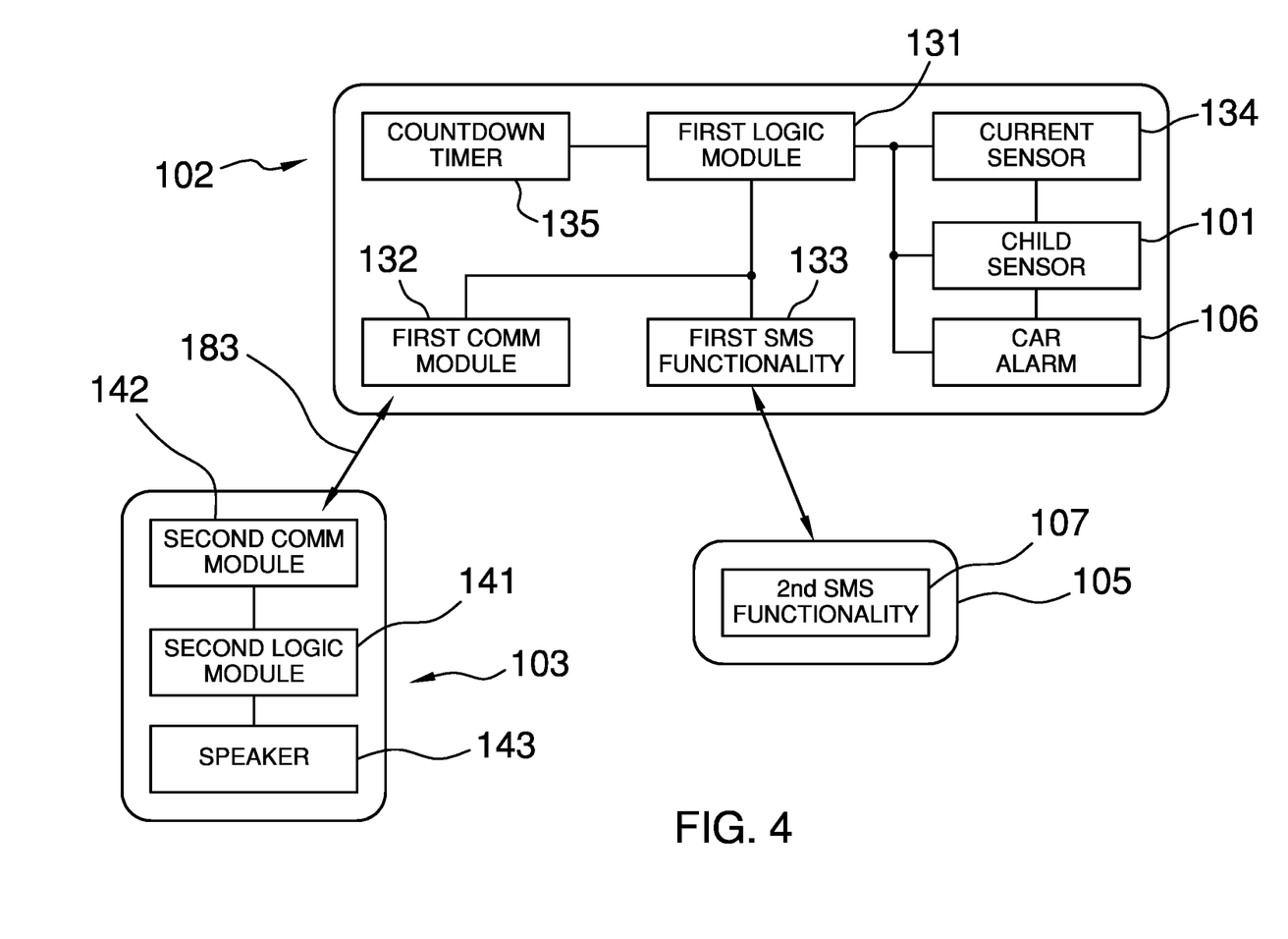
FIG. 4 is a block diagram of an embodiment of the disclosure.

The controller 102 further comprises a first logic module 131, a first communication module 132, a first SMS functionality 133, a current sensor 134, and a countdown timer 135. The first communication module 132, the first SMS functionality 133 and the current sensor 134 are electrically connected to the first logic module 131. Depending on the design, countdown timer 135 can be an independent device that is connected to the first logic module 131 or can be a functionality contained within the first logic module 131. The first logic module 131 is a programmable device that is used to control and operate the controller 102. Depending on the specific design and the selected components, the first logic module 131 can be a separate component within the device or the functions of the first logic module 131 can be incorporated into another component within the controller 102.

The first communication module 132 is a commercially available transceiver that is used to create a wireless communication 183 link between the controller 102 and the key fob 103. The first logic module 131 will use the first communication module 132 to send a first message 151, initiating an alarm, over the wireless communication 183 link 103. The first logic module 131 will use the first communication module 132 to send further send a third message 153, discontinuing the alarm, over the wireless communication 183 link to the key fob 103. The first SMS functionality 133 is a commercially available electrical device that is designed to send and receive text-based messages over a commercially available SMS communication 184 service. The first logic module 131 will use the first SMS functionality 133 to send a second message 152, initiating an alarm, over the SMS communication 184 service to a previously designated personal data device 105 or devices. The first logic module 131 will use the first SMS functionality 133 to further send a fourth message 154, discontinuing the alarm, over the SMS communication 184 service to the same previously designated personal data device 105 or devices. The current sensor 134 is an electrical device that is used to detect current flow through an electrical circuit.

In the first potential embodiment of the disclosure, the current sensor 134 is configured to detect current flow from the alternator of the automobile. The current sensor 134 is connected to the alternator through the use of a cable 185. The logic of the measurement is: 1) if the alternator is generating an electric current the engine is operating; 2) if the engine is running the automobile is in operation; and, if the automobile is in operation the detected passenger is in a controlled environmental conditions and is therefore not unattended. The use of the current sensor 134 is discussed elsewhere in this disclosure. The countdown timer 135 is used for timing purposes and is discussed elsewhere in this disclosure.

The key fob 103 is an electrical device that is carried by the user. The key fob 103 sounds an audible alarm when the key fob 103 receives the first message 151 from the controller 102. The key fob 103 will continue to sound the audible alarm until the key fob 103 receives the third message 153 from the controller 102. The key fob 103 further comprises a second logic module 141, a second communication module 142, and a speaker 143. The second logic module 141 is a programmable device that is used to control and operate the key fob 103. Depending on the specific design and the selected components, the second logic module 141 can be a separate component within the key fob 103 or the functions of the second logic module 141 can be incorporated into another component within the key fob 103.

The speaker 143 is a commercially available speaker or buzzer that is used to generate an audible sound that is used as an alarm. The second communication module 142 is a commercially available transceiver that is used to create a wireless communication 183 link between the key fob 103 and the controller 102. The second logic module 141 will monitor the second communication module 142 for receipt of either the first message 151 or the third message 153. If the first message 151 is received, the second logic module 141 generates a signal that drives the audible sound through the speaker 143. If the third message 153 is received, the logic module discontinues the signal that drives the audible sound through the speaker 143 thus silencing the speaker 143.

The personal data device 105 is a readily and commercially available personal data device that is further defined with a second SMS functionality 107. The personal data device 105 receives through the second SMS functionality 107 alarm notifications from the controller 102 in the form of the second message 152 (alarm initiated) and the fourth message 154 (alarm discontinued). The contact data associated with the personal data device 105 has to be loaded into the controller 102 in order for the personal data device 105 to receive the alarm notifications.

The car alarm 106 is a security device that is associated with the automobile the invention 100 is adapted to work with. When initiated, the car alarm 106 will sound a horn or siren and flash the exterior lights of the automobile for the purpose of attracting attention to the automobile. The controller 102 is wired into the car alarm 106 through the cable 185 such that the controller 102 can initiate the car alarm 106.

Figure 6:
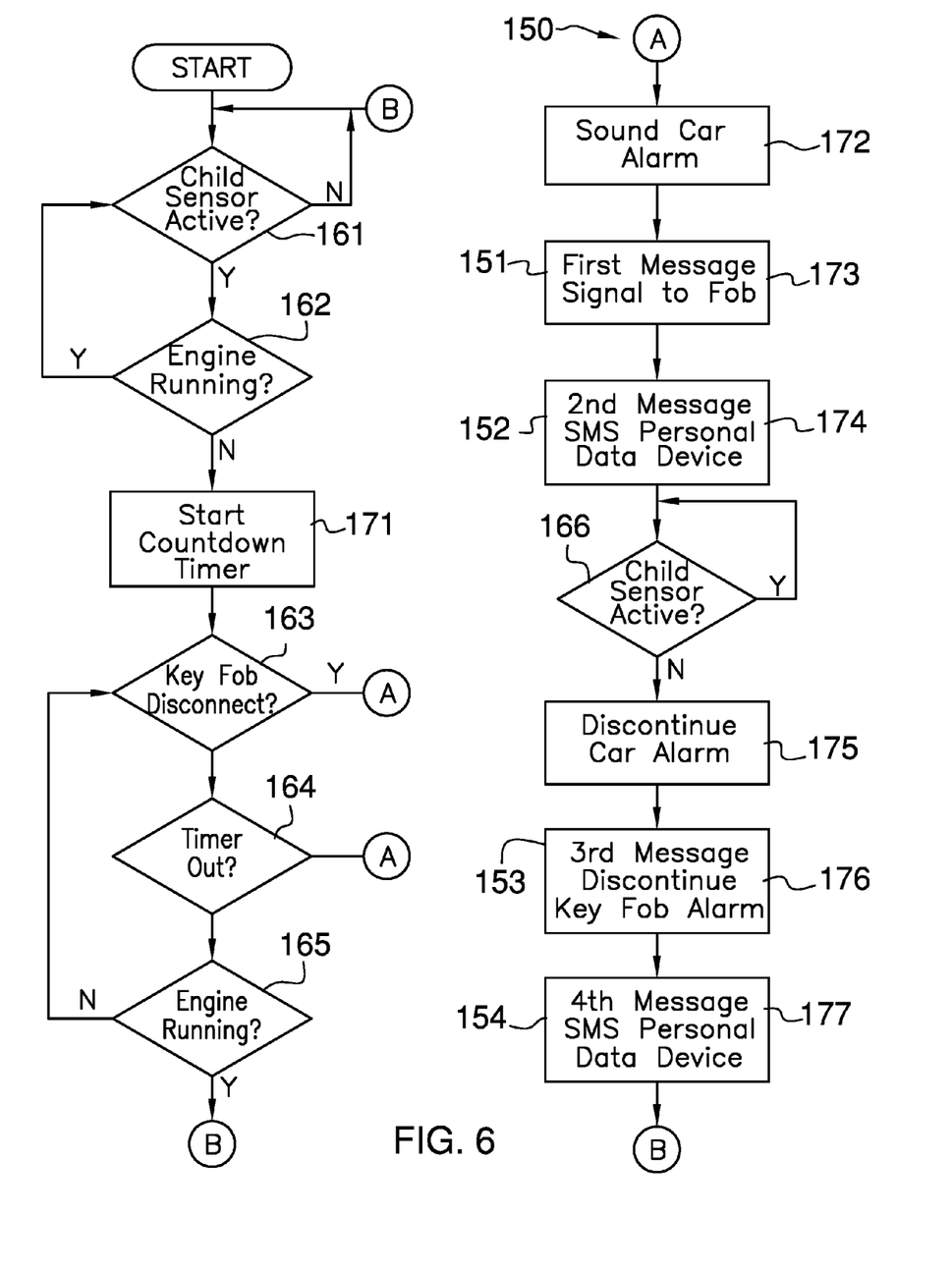
FIG. 6 is a flowchart of an embodiment of the disclosure.

The operation of the controller 102 is discussed in this paragraph and the next paragraph. The first logic module 131 makes a first decision 161 to determine whether the passenger sensed signal 110 indicates a positive signal that indicates that a passenger is in the safety seat 108. If the passenger sensed signal 110 indicates a negative signal, 131 first logic module loops through the first decision 161. If the passenger sensed signal 110 indicates a positive signal, the first logic module 131 makes a second decision 162 to determine if the engine of the automobile is running. The first logic module 131 does this by querying the current sensor 134 to determine if alternator is generating electric current. If first logic module 131 determines that the engine is running the first logic module 131 loops to the first decision 161. If the first logic module 131 determines that the current sensor 134 is not detecting electric current, the first logic module 131 takes a first action 171 of starting the countdown timer 135. The first logic module 131 then makes a third decision 163 to determine whether the key fob 103 is connected to the first communication module 132 over the wireless communication 183 link. If there is no connection, the first logic module 131 initiates the alarm procedure 150. The alarm procedure 150 is discussed in the next paragraph. If the alarm procedure 150 is not initiated, the first logic module 131 makes a fourth decision 164 to determine if the countdown timer 135 has timed out. If the countdown timer 135 has timed out the first logic module 131 initiates the alarm procedure 150 as discussed in the next paragraph. If the alarm procedure 150 is not initiated, the first logic module 131 makes a fifth decision 165 to determine if the engine is still running by querying the current sensor 134 to determine if alternator is generating electric current. If first logic module 131 determines that the engine is running the first logic module 131 loops to the first decision 161. Otherwise the first logic module 131 loops to the third decision 163.

When the alarm procedure 150 is initiated, the first logic module 131 takes a second action 172 of initiating the car alarm 106. The first logic module 131 next takes a third action 173 of sending a first message 151 (alarm) to the key fob 103 over the wireless communication 183 link. The first logic module 131 takes a fourth action 174 by sending a second message 152 (alarm) to the personal data device 105 using the first SMS functionality 133 and the SMS communication 184 service. The first logic module 131 makes a sixth decision 166 to determine whether the passenger sensed signal 110 still indicates a positive signal. If the passenger sensed signal 110 remains positive, the first logic module 131 loops through the sixth decision 166 until the status of the passenger sensed signal 110 changes. If the passenger sensed signal 110 does not indicate a positive signal, the first logic module 131 takes a fifth action 175 of discontinuing the car alarm 106. The first logic module 131 takes a sixth action 176 by sending a third message 153 (discontinue alarm) to the key fob 103 over the wireless communication 183 link. The first logic module 131 takes a seventh action 177 by sending a fourth message 154 (discontinue alarm) to the personal data device 105 using the first SMS functionality 133 and the SMS communication 184 service.

The first communication module 132 is a commercially available transceiver that supports 802.11 communication protocols. The second communication module 142 is a commercially available transceiver that supports 802.11 communication protocols. Methods to integrate transceiver that supports 802.11 communication protocols into programmable logic modules are well known and documented in the electrical arts. In the first potential embodiment of the disclosure, the second logic module 141 and the second communication module 142 are both implemented on an ESP8266 (Expressif) integrated circuit with 802.11 capabilities. The first logic module 131 is an Arduino based microcontroller with the associated shields. The first communication module 132 is a commercially available Arduino shield. The first SMS functionality 133 is a commercially available Arduino shield. The speaker 143 is a commercially available buzzer. The use of Arduino microcontrollers and Arduino shields are well known and documented in the electrical arts. A suitable current sensor 134 includes, but is not limited to, a split core current transformer such as the Sparkfun SEN-011005.

The following definitions were used in this disclosure:

Automobile: As used in this disclosure, an automobile is a road vehicle that that specializes in carrying passengers and light cargo loads. This definition is specifically intended to include vehicles generally referred to as pickup trucks, vans, and minivans.

Buzzer: As used in this disclosure, a buzzer is two lead electrical device that generates an audible sound when voltage is applied to the two leads.

Cable: As used in this disclosure, a cable is a collection of insulated wires covered by a protective casing that is used for transmitting electricity or telecommunication signals.

Control System: As used in this disclosure, a control system is a first device or system that manages and regulates the behavior or operation of a second device or system.

Load Cell: As used in this disclosure, a load cell is a transducer that measures an applied force and generates an electrical signal that is a known function of the applied force.

Logic Module: As used in this disclosure, a logic module is an electrical device that is programmable and that accepts digital and analog inputs, processes the digital and analog inputs according to previously stored instruction and to provide the results of these instructions as digital or analog outputs.

Personal Data Device: As used in this disclosure, a personal data device is a handheld device that is used for managing personal information and communication. Examples of personal data device include, but are not limited to, cellular phones, tablets and smart phones.

Sensor: As used in this disclosure, a sensor is a device that receives and responds in a predetermined way to a signal or stimulus.

SMS: As used in this disclosure, SMS is an abbreviation for short message service. The short message service is a service that often provided with the cellular services that support personal data devices. Specifically, the SMS allows for the exchange of written messages between personal data devices. The SMS is commonly referred to as text messaging.

Speaker: As used in this disclosure, a speaker is an electrical device that converts an electrical signal into an audible sound.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A safety device comprising:
    a passenger sensor, a controller, and a key fob;
    wherein the safety seat is adapted for use in an automobile;
    wherein the safety device is a safety system designed to alert travelers when a passenger is left unattended in a safety seat;
    wherein the passenger sensor is incorporated into the safety seat in order to indicate when a passenger is in the safety seat;
    wherein the passenger sensor is monitored by the controller;
    wherein the controller is connected to a car alarm of the automobile;
    wherein the controller monitors the operation of the automobile;
    wherein the controller initiates the car alarm;
    wherein the controller initiates an alarm device that is contained in the key fob;
    wherein the controller sends an alarm message to a personal data device;
    wherein the passenger sensor comprises a plurality of pressure sensors and a logic circuit;
    wherein the plurality of pressure sensors further comprises a plurality of seat sensors and a plurality of back rest sensors;
    wherein each of the plurality of seat sensors are installed in the seat of the safety seat;
    wherein each of the plurality of back rest sensors are installed in the back rest of the safety seat;
    wherein the plurality of sensors are connected to the logic circuit;
    wherein the logic circuit is an electrical circuit that monitors each of the plurality of pressure sensors and physically generates a passenger sensed signal.

2. The safety device according to claim 1 wherein the failure of any first single sensor selected from the plurality of seat sensors and the simultaneous failure of any second single sensor selected from the plurality of back rest sensors will not prevent the safety device from successfully sensing the passenger and generating the passenger sensed signal.

3. The safety device according to claim 2
    wherein the plurality of pressure sensors further comprises a first pressure sensor, a second pressure sensor, a third pressure sensor, a fourth pressure sensor, a fifth pressure sensor, a sixth pressure sensor, a seventh pressure sensor, and an eighth pressure sensor;
    wherein the plurality of seat sensors comprises the first pressure sensor, the second pressure sensor, the third pressure sensor, and the fourth pressure sensor;
    wherein the logic circuit comprises a first And circuit and a second And circuit;
    wherein the first pressure sensor generates a first signal;
    wherein the first signal is connected to the first And circuit;

wherein the second pressure sensor generates a second signal;
wherein the second signal is connected to the first And circuit;
wherein the third pressure sensor generates a third signal;
wherein the third signal is connected to the second And circuit;
wherein the fourth pressure sensor generates a fourth signal;
wherein the fourth signal is connected to the second And circuit.

4. The safety device according to claim 3
wherein the plurality of back rest sensors comprises the fifth pressure sensor, the sixth pressure sensor, the seventh pressure sensor, and the eighth pressure sensor;
wherein the logic circuit further comprises a third And circuit, and a fourth And circuit;
wherein the fifth pressure sensor generates a fifth signal;
wherein the fifth signal is connected to the third And circuit;
wherein the sixth pressure sensor generates a sixth signal;
wherein the sixth signal is connected to the third And circuit;
wherein the seventh pressure sensor generates a seventh signal;
wherein the seventh signal is connected to the fourth And circuit;
wherein the eighth pressure sensor generates an eighth signal;
wherein the eighth signal is connected to the fourth And circuit.

5. The safety device according to claim 4
wherein when the first signal and the second signal both indicate detection of a passenger in the safety seat, the first And circuit generates a positive signal;
wherein when the third signal and the fourth signal both indicate detection of a passenger in the safety seat, the second And circuit generates a positive signal;
wherein when the fifth signal and the sixth signal both indicate detection of a passenger in the safety seat, the third And circuit generates a positive signal;
wherein when the seventh signal and the eighth signal both indicate detection of a passenger in the safety seat, the fourth And circuit generates a positive signal.

6. The safety device according to claim 5
wherein the logic circuit further comprises a first Or circuit;
wherein the first And circuit and the second And circuit are attached to the first Or circuit such that when either or both the first And circuit and the second And circuit have a positive signal the first Or circuit generates a positive signal.

7. The safety device according to claim 6
wherein the logic circuit further comprises a second Or circuit;
wherein the third And circuit and the fourth And circuit are attached to the second Or circuit such that when either or both the third And circuit and the fourth And circuit have a positive signal the second Or circuit generates a positive signal.

8. The safety device according to claim 7
wherein the logic circuit further comprises a third Or circuit;
wherein the first Or circuit and the second Or circuit are attached to the third Or circuit such that when either or both the first Or circuit and the second Or circuit have a positive signal the third Or circuit generates a positive signal;
wherein the output of the third Or circuit is the passenger sensed signal.

9. The safety device according to claim 8
wherein the controller further comprises a first logic module, a first communication module, a first SMS functionality, a current sensor, and a countdown timer;
wherein the first communication module, the first SMS functionality and the current sensor are electrically connected to the first logic module;
wherein the countdown timer is selected from the group consisting of an independent device that is connected to the first logic module or a functionality contained within the first logic module.

10. The safety device according to claim 9
wherein the first logic module is a programmable device;
wherein the first logic module controls the controller;
wherein the first communication module is a transceiver;
wherein the first communication device that creates a wireless communication link between the controller and the key fob;
wherein the first SMS functionality is a commercially available electrical device that sends text based messages using a SMS communication service.

11. The safety device according to claim 10
wherein the current sensor is an electrical device that is used to detect current flow through an electrical circuit;
wherein the current sensor is configured to detect electricity flow from an alternator of the automobile.

12. The safety device according to claim 11
wherein the key fob is an electrical device;
wherein the key fob sounds an audible alarm when the key fob receives a first message from the controller;
wherein the key fob discontinues the audible alarm when the key fob receives a third message from the controller;
wherein the key fob further comprises a second logic module, a second communication module, and a speaker;
wherein the second logic module is a programmable device that is used to control and operate the key fob;
wherein the speaker is an electrical device selected from the group consisting of speakers or buzzers;
wherein the second communication module is a transceiver that creates the wireless communication link between the key fob and the controller.

13. The safety device according to claim 8
wherein the controller further comprises a first logic module, a first communication module, a current sensor, and a countdown timer;
wherein the first communication module and the current sensor are electrically connected to the first logic module;
wherein the countdown timer is selected from the group consisting of an independent device that is connected to the first logic module or a functionality contained within the first logic module.

14. The safety device according to claim 13
wherein the first logic module is a programmable device;
wherein the first logic module controls the controller;
wherein the first communication module is a transceiver;
wherein the first communication device that creates a wireless communication link between the controller and the key fob;

wherein the first logic module makes a first decision to determine whether the passenger sensed signal indicates a positive signal that indicates that a passenger is in the safety seat;

wherein the first logic module makes a second decision to determine if the engine of the automobile is running;

wherein the first logic module takes a first action of starting the countdown timer;

wherein the first logic module makes a third decision to determine whether the key fob is connected to the first communication module over the wireless communication link;

wherein the first logic module makes a fourth decision to determine if the countdown timer has timed out;

wherein the first logic module takes a second action of initiating the car alarm;

wherein the first logic module next takes a third action of sending the first message to the key fob over the wireless communication link;

wherein the first logic module takes a fourth action of discontinuing the car alarm;

wherein the first logic module takes a fifth action by sending a third message to the key fob over the wireless communication link.

15. The safety device according to claim 14
wherein the current sensor is an electrical device that is used to detect current flow through an electrical circuit;
wherein the current sensor is configured to detect electricity flow from an alternator of the automobile.

16. The safety device according to claim 15
wherein the key fob is an electrical device;
wherein the key fob sounds an audible alarm when the key fob receives a first message from the controller;
wherein the key fob discontinues the audible alarm when the key fob receives a third message from the controller;
wherein the key fob further comprises a second logic module, a second communication module, and a speaker;
wherein the second logic module is a programmable device that is used to control and operate the key fob;
wherein the speaker is an electrical device selected from the group consisting of speakers or buzzers;
wherein the second communication module is a transceiver that creates the wireless communication link between the key fob and the controller.

17. The safety device according to claim 9
wherein the first logic module is a programmable device;
wherein the first logic module controls the controller;
wherein the first communication module is a transceiver;
wherein the first communication device that creates a wireless communication link between the controller and the key fob;

wherein the first SMS functionality is a commercially available electrical device that sends text based messages using a SMS communication service;

wherein the first logic module makes a first decision to determine whether the passenger sensed signal indicates a positive signal that indicates that a passenger is in the safety seat;

wherein the first logic module makes a second decision to determine if the engine of the automobile is running;

wherein the first logic module takes a first action of starting the countdown timer;

wherein the first logic module makes a third decision to determine whether the key fob is connected to the first communication module over the wireless communication link;

wherein the first logic module makes a fourth decision to determine if the countdown timer has timed out;

wherein the first logic module takes a second action of initiating the car alarm;

wherein the first logic module next takes a third action of sending the first message to the key fob over the wireless communication link;

wherein the first logic module takes a fourth action by sending a second message the first SMS functionality;

wherein the first logic module takes a fifth action of discontinuing the car alarm;

wherein the first logic module takes a sixth action by sending a third message to the key fob over the wireless communication link;

wherein the first logic module takes a seventh action by sending a fourth message using the first SMS functionality.

18. The safety device according to claim 17
wherein the current sensor is an electrical device that is used to detect current flow through an electrical circuit;
wherein the current sensor is configured to detect electricity flow from an alternator of the automobile.

19. The safety device according to claim 18
wherein the key fob is an electrical device;
wherein the key fob sounds an audible alarm when the key fob receives a first message from the controller;
wherein the key fob discontinues the audible alarm when the key fob receives a third message from the controller;
wherein the key fob further comprises a second logic module, a second communication module, and a speaker;
wherein the second logic module is a programmable device that is used to control and operate the key fob;
wherein the speaker is an electrical device selected from the group consisting of speakers or buzzers;
wherein the second communication module is a transceiver that creates the wireless communication link between the key fob and the controller.

* * * * *